United States Patent

Duprat et al.

(10) Patent No.: US 9,024,959 B2
(45) Date of Patent: May 5, 2015

(54) DEMAND-PAGED TEXTURES

(75) Inventors: Jean-Luc Duprat, Victoria (CA); Paul Lalonde, Victoria (CA); Andrew T Forsyth, Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 667 days.

(21) Appl. No.: 12/642,917

(22) Filed: Dec. 21, 2009

(65) Prior Publication Data

US 2011/0148894 A1   Jun. 23, 2011

(51) Int. Cl.

| | |
|---|---|
| *G06T 11/40* | (2006.01) |
| *G09G 5/00* | (2006.01) |
| *G06T 17/00* | (2006.01) |
| *G06T 11/00* | (2006.01) |
| *G06T 15/04* | (2011.01) |

(52) U.S. Cl.
CPC ............... *G06T 11/001* (2013.01); *G06T 15/04* (2013.01)

(58) Field of Classification Search
CPC ..................................................... G06T 11/001
USPC ......................................................... 345/552
See application file for complete search history.

(56) References Cited

U.S. PATENT DOCUMENTS

| | | | | |
|---|---|---|---|---|
| 6,014,724 | A  * | 1/2000 | Jenett ............................. | 711/103 |
| 6,523,102 | B1 * | 2/2003 | Dye et al. ....................... | 711/170 |
| 6,778,181 | B1 * | 8/2004 | Kilgariff et al. ............... | 345/582 |
| 7,817,161 | B2 * | 10/2010 | Lefebvre et al. .............. | 345/582 |

OTHER PUBLICATIONS

Martin Mittring and Crytek GmbH. 2008. Advanced virtual texture topics. In ACM SIGGRAPH 2008 Games (SIGGRAPH '08). ACM, New York, NY, USA, 23-51. (2008).*
Sylvain Lefebre, Jérome Darbon, and Fabrice Neyret. "Unified Texture Management for Arbitrary Meshes." Research Report No. 5210. (2004).*
Charles Hollemeersch, Bart Pieters, Peter Lambert, and Rik Van de Walle. "Accelerating virtual texturing using CUDA." 2009 GPU Technology Conference (GTC2009) (Oct. 2, 2009).*
Seiler, Larry, "Larrabee: A Many-Core x86 Architecture for Visual Computing", ACM Transactions on Graphics, vol. 27, No. 3, Article 18, Publication date: Aug. 2008.
"Sparse Virtual Textures", Webpage available at: http://silverspaceship.com/src/svt/.
Peachey, Darwyn, "Texture on Demand", Pixar Animation Studios—Technical Memo #217, Copyright 1990 Pixar Animation Studios, San Rafael, California.

* cited by examiner

*Primary Examiner* — Kee M Tung
*Assistant Examiner* — Zhengxi Liu
(74) *Attorney, Agent, or Firm* — Jordan IP Law, LLC

(57) ABSTRACT

A method and system may include a chip having graphics rendering hardware, a cache and a processor to execute an application with texture allocation logic to receive notification of a page miss from the graphics rendering hardware. The logic can map the page miss to a tile of a texture image, store the tile as an entry to the cache, and map the entry to a virtual address space of a virtual image corresponding to the texture image. The system may also include off-chip memory to store the texture image.

20 Claims, 2 Drawing Sheets

DEMAND-PAGED TEXTURES

BACKGROUND

Graphics applications such as 3D (3-dimensional) computer games, flight simulators and other 3D imaging systems may often involve the real-time rendering of a wide variety of scenes that can have complex and rich textures. Accordingly, these applications may include rendering code to enable the display of textures at various resolutions (e.g., high resolution for zooming into a scene and low resolution for zooming out of a scene). In particular, conventional rendering code usually has access to pre-filtered versions of these textures, at various resolutions. Some of these resolutions may in reality not be required, in part or in whole, to render the current frame; accordingly, they can be a waste of memory. Moreover, conventional solutions may also limit the texture image compression algorithm to that directly supported by the rendering hardware that performs the decoding. As a result, such a solution may experience relatively low compression rates and wasted memory, which could lead to less texture detail.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for a method of operating a graphics application in which a page miss is detected. The method also provides for mapping an address associated with the page miss to a tile of a virtual image associated with a texture image, and storing the tile as an entry in a cache. The entry can also be mapped to the virtual address space of the virtual image.

Embodiments can also provide for a computer readable medium comprising a set of stored instructions which, if executed, cause an apparatus to detect a page miss and map an address associated with the page miss to a tile of a virtual image. The virtual image can correspond to a texture image. The instructions may also cause an apparatus to store the tile as an entry to a cache and map the entry to the virtual address space of the virtual image.

In addition, embodiments may include a system having a chip with graphics rendering hardware, a cache and a processor to execute an application with texture allocation logic. The texture allocation logic can receive notification of a page miss from the graphics rendering hardware, map an address associated with the page miss to a tile of a virtual image that corresponds to a texture image, store the tile as an entry in a cache, and map the entry to the virtual address space of the virtual image.

Embodiments may also provide for a method of operating a graphics application in which virtual address space is reserved for a virtual image corresponding to a texture image. A texture sampling request can be issued for a texel of the virtual image. The method may further provide for receiving notification of a page miss in response to the texture sampling request, and mapping an address associated with the page miss to the tile. The tile can also be fetched from a compressed image corresponding to the texture image and decoded based on a decompression algorithm. The method may then provide for storing the decoded tile as an entry in a cache, mapping the entry to a corresponding location in the virtual image, and re-issuing the texture sampling request.

Figure 1:
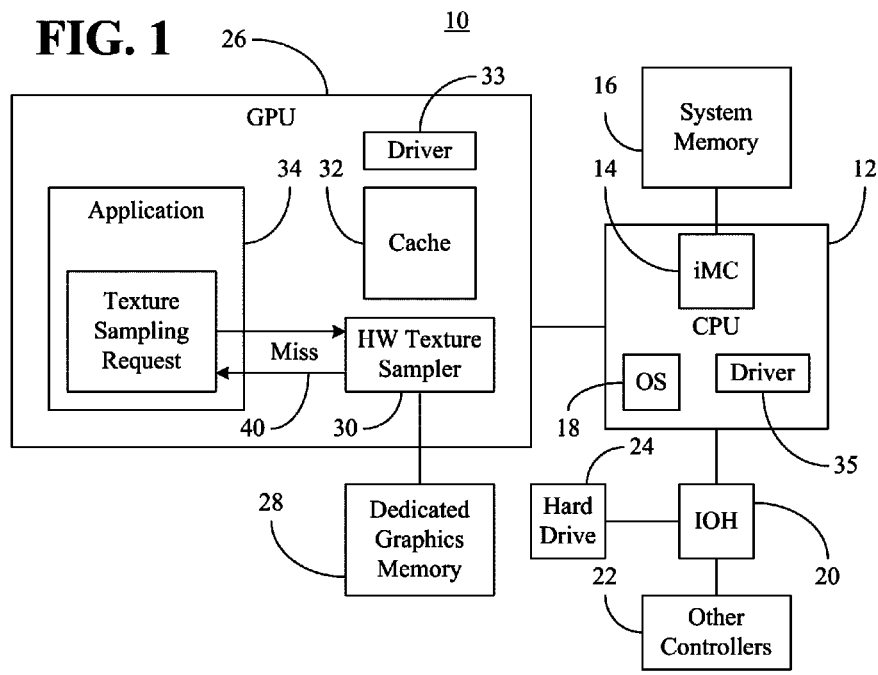
FIG. 1 is a block diagram of an example of a computing system according to an embodiment.

Turning now to FIG. 1, a computing system 10 is shown, wherein the system 10 may be part of a mobile platform such as a laptop, personal digital assistant (PDA), wireless smart phone, media player, imaging device, mobile Internet device (MID), etc., or any combination thereof. The system 10 may also be part of a fixed platform such as a personal computer (PC), server, workstation, etc. The illustrated system 10 includes a central processing unit (CPU) 12 with an integrated memory controller (iMC) 14 that provides access to system memory 16, which could include graphics dual data rate (GDDR) synchronous dynamic random access memory (SDRAM, e.g., DDR3 SDRAM JEDEC Standard JESD79-3C, April 2008) modules. The modules of the system memory 16 may be incorporated into a single inline memory module (SIMM), dual inline memory module (DIMM), small outline DIMM (SODIMM), and so on. The CPU 12 may also have one or more processor cores (not shown), where each core may be fully functional with instruction fetch units, instruction decoders, level one (L1) cache, execution units, and so on. The CPU 12 could alternatively communicate with an off-chip variation of the iMC 14, also known as a Northbridge, via a front side bus or a point-to-point fabric that interconnects each of the components in the system 10. The CPU 12 may also execute an operating system (OS) 18 such as a Microsoft Windows, Linux, or Mac (Macintosh) OS.

The illustrated CPU 12 communicates with an I/O hub (IOH) 20, also known as a Southbridge, via a hub bus. The iMC 14/CPU 12 and the IOH 20 are sometimes referred to as a chipset. The CPU 12 may also be operatively connected to a network (not shown) via a network port through the IOH 20 and various other controllers 22. Thus, the other controllers 22 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The other controllers 22 could also communicate with the IOH 20 to provide support for user interface devices such as a display, keypad, mouse, etc. in order to allow a user to interact with and perceive information from the system 10.

The IOH 20 may also have internal controllers such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated IOH 20 is also coupled to storage, which may include a hard drive 24, read only memory (ROM), optical disk, flash memory (not shown), etc.

The illustrated system 10 also includes a graphics processing unit (GPU) 26 coupled to a dedicated graphics memory 28. The dedicated graphics memory 28 could include GDDR or DDR SDRAM modules, or any other memory technology suitable for supporting graphics rendering. The GPU 26 and graphics memory 28 might be installed on a graphics/video card, wherein the GPU 26 could communicate with the CPU 12 via a graphics bus such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 12 die, configured as a discrete card on the motherboard, etc.

The illustrated GPU 26 includes a cache 32, and rendering hardware such as a texture sampler 30 that could include functionality such as vertex processing, texture application, rasterization, etc., to enhance and/or support graphics performance. The cache 32 could be a software cache that is wired in hardware. The GPU 26 may execute a graphics application 34 (e.g., user space code) such as a 3D (3-dimensional) computer game, flight simulator, or other 3D imaging system, that may often involve the real-time rendering of various graphical scenes. Accordingly, texture images may be used in the execution of the application 34, wherein the texture images could be sampled from off-chip storage such as dedicated graphics memory 28, system memory 16 or even hard drive 24.

The illustrated cache 32, which might be implemented as static RAM (SRAM), is a software-managed cache that is allocated to contain the physical pages of memory that will be used by the subset of a virtual image in use. The cache 32 should be large enough to contain at least the working set of virtual images (e.g., the tiles that will be used to generate an image in the current frame). The use of the cache 32 to provide texture tiles on a demand basis enables the GPU 26 to process only the tiles that are needed, and may significantly enhance performance for the overall system 10.

Generally, at runtime the application 34 may reserve virtual address space for virtual images corresponding to the texture images. As the graphics application 34 executes on the GPU 26, it can issue texture sampling requests to the texture sampler 30, which can resolve the requests by making reads ("taps") from the portions of the virtual image. A given texture request might therefore cause the texture sampler 30 to generate one or more taps. Moreover, the taps could result in page misses 40, wherein the page misses may identify the faulting virtual address. In the illustrated example, the graphics application 34 is configured to receive notification of the page misses 40, map the page misses 40 to tiles of the texture image, and store each tile as an entry to the cache 32, wherein a tile can be defined as a hardware page-sized region of the texture image. Thus, each tile can be stored into a free physical memory page of the cache 32 on an as-needed basis. The miss 40 itself may be reported to the graphics application 34 on the GPU 26 either by the OS 18 or a driver 33, 35; or this step may be bypassed entirely and the hardware texture sampler 30 may report the miss 40 directly to the application 34.

As will be discussed in greater detail, the tiles could be obtained in a number of different ways. For example, the tiles could be fetched from a compressed image corresponding to the texture image and decoded. In another example, the tiles could be synthesized based on one or more pre-existing entries in the cache 32, based on some external parameters and program code; or generated as impostor tiles to be replaced by more accurate data at a later time. The pre-existing entries could also come from a different MIP (multum in parvo) level of the resolution hierarchy for the requested texture. Each tile may be obtained using any one of these or other techniques.

In addition, the illustrated page misses 40 can be issued directly to and processed by the graphics application 34, rather than being handled by the graphics drier 33, OS 18, or internally within the texture sampler 30. This technique enables the application 34 to leverage implementation-specific information about the texture images that is typically not available to the OS 18, and to use more flexibility (e.g., programmability) than is often available through the texture sampler 30.

Figure 2:
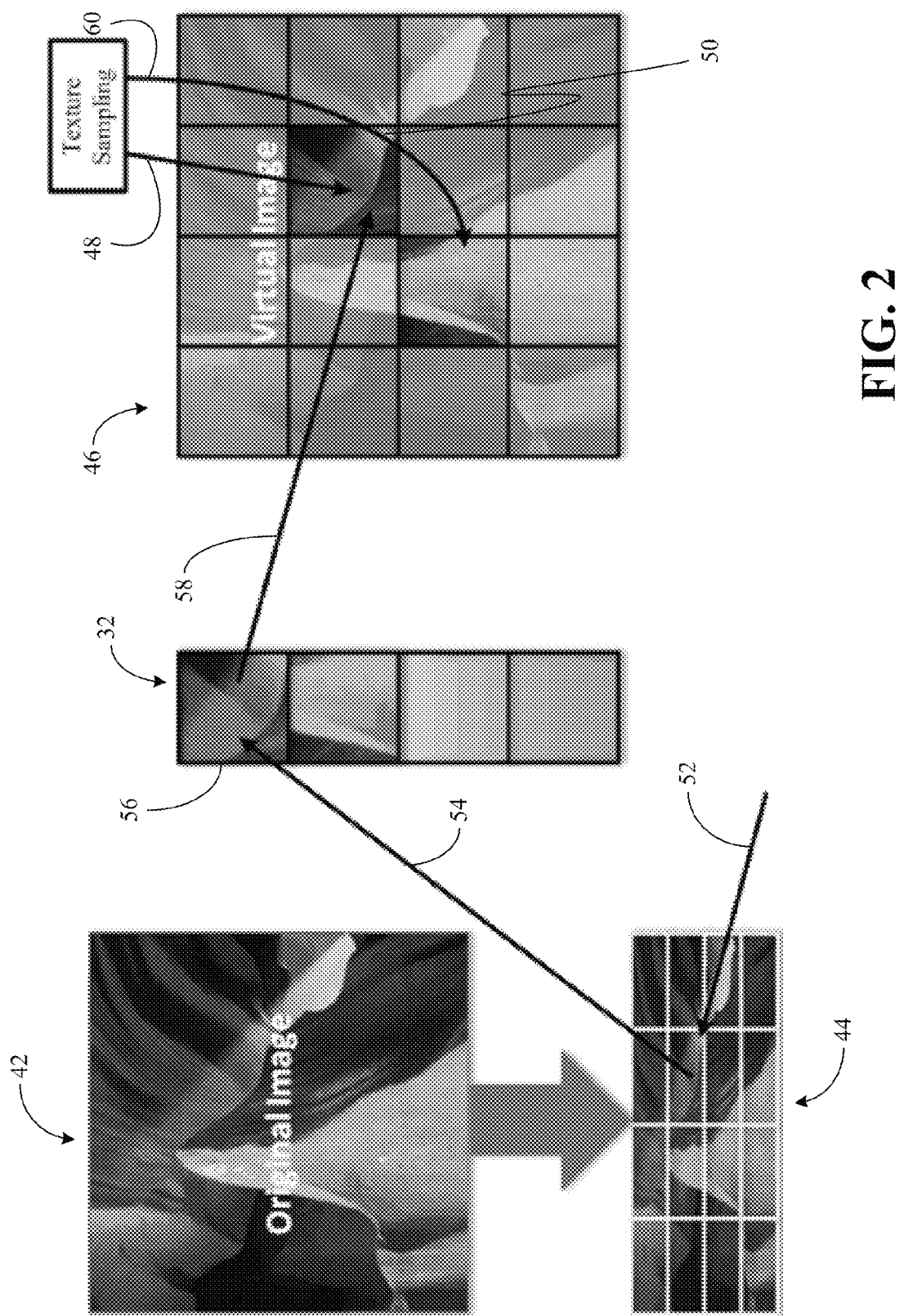
FIG. 2 is a block diagram of a scheme of rendering compressed graphics textures according to an embodiment.

With continuing reference to FIGS. 1 and 2, an original texture image 42 is shown. The texture image 42 might be used in rendering a scene from a 3D game, for example. In this regard, the texture image 42, which could include portions of the scene that are not currently visible on the display (e.g., facing away or otherwise out of the field of view), can be quite large. The entire texture image 42 could even require more space than available in the graphics memory 28 and/or system memory 16, and may be sampled from off-chip storage such as hard drive 24. In the illustrated example, the texture image 42 is converted/encoded into a compressed image 44, broken into tiles that are efficiently accessible in a random order, and stored in the dedicated graphics memory 28. The compression process could be conducted offline at the software development stage of the graphics application 34 or at a later time (e.g., during a software upgrade) as appropriate. The tiles that the compressed image 44 is broken into can correspond to graphics-hardware page-sized regions of the texture image 42 (e.g., 4 Kbyte, 64 Kbyte or 2 Mbyte page sizes). The compressed image 44 may use a variable bit-rate compression algorithm, such as a JPEG (Joint Photographic Experts Group, JPEG File Interchange Format/JFIF, Part 5 (10918-5)) algorithm, and while all tiles in the decoded format of a virtual image 46 have the same size in bytes, the tiles may be of variable size in the compressed image 44.

As will be discussed in greater detail, the compression algorithm used to generate the compressed image 44 need not be supported by the texture sampler 30. For example, while the texture sampling request may be limited to uncompressed textures such as ARGB (Alpha Red Green Blue, 4 bytes/channel) or low compression rate algorithms such as S3TC (S3 Texture Compression, sometimes also called BC or DXTC), the compressed image 44 could be encoded via a more robust algorithm such as JPEG. As a result, higher compression rates may be achieved while better preserving perceptual acuity, resulting in more texture detail in scenes.

As already noted, the graphics application 34 can reserve a virtual address space for a virtual image 46 that corresponds to the original texture image 42, and bind the virtual address space as the data the texture sampler 30 will read/tap when rendering. During operation, for example, a shader program in the graphics application 34 might originate a lookup to determine what color to use for a particular pixel/fragment on the display. In the illustrated example, the application 34 therefore issues a new texel (e.g., texture element or texture pixel) sampling request 48 for a tile 50 (this request is also known as a texture tap). The texture sampler 30 may receive the request 48, and make one or more taps from the virtual image 46 based on the request 48.

If a miss results from any of the taps, the texture sampler 30 can report the page miss to the graphics application 34, which may map the page miss to the tile using the faulting virtual address, and conduct a fetch 52 of the tile from the compressed image 44. The graphics application 34 can then decode in software the tile based on the compression algorithm (e.g., JPEG) of the compressed image 44, wherein the compression algorithm may be unsupported by the texture sampler 30. The application 34 can also encode the fetched tile with an algorithm (e.g., S3TC) that is supported by the texture sampler 30, and store 54 the decoded/transcoded tile as an entry 56 in the cache 32. The entry can be mapped 58 to the virtual memory so that if the request is re-issued, a page miss will not occur. At this point there are two virtual addresses that refer to the decoded tile—that of the cache entry 56, and that of the tile 50 in the virtual address space. The illustrated process can repeat with another texel sampling request 60.

Thus, the illustrated techniques provide a real-time, on-demand solution to texture rendering, wherein the working set for the graphics application 34 can be significantly reduced. This solution can be done for a subset of the textures in a frame and can work in conjunction with other schemes. In particular, the illustrated hardware virtual memory mechanism can both simplify the implementation and make it more performant (potentially saving a second pass of world rendering). This technique may also be applied selectively rather than to all the textures in the environment.

Figure 3:
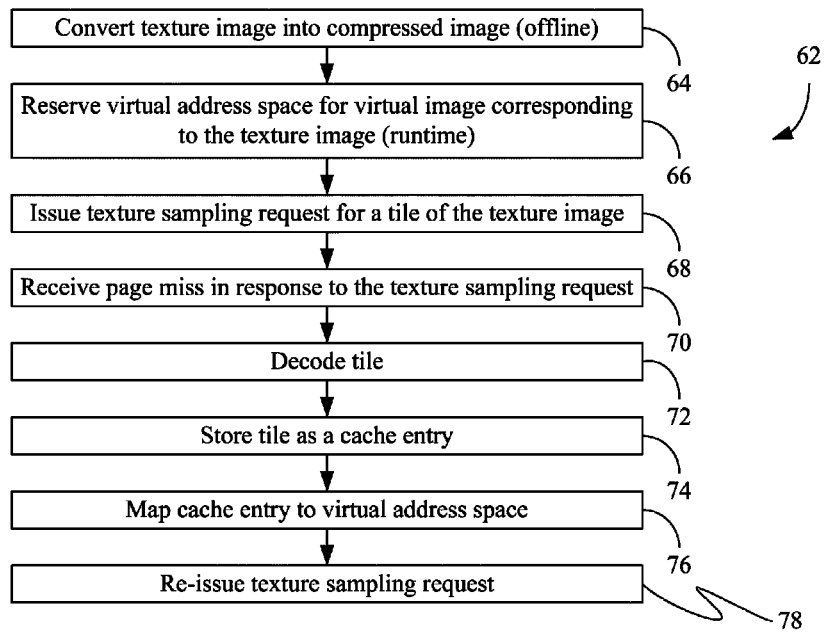
FIG. 3 is a flowchart of an example of a method of rendering graphics textures according to an embodiment.

FIG. 3 shows a method 62 of rendering graphics textures. The method 62 may be implemented in executable software as a set of logic instructions stored in a machine- or computer-readable medium of a memory such as random access memory (RAM), read only memory (ROM), programmable ROM (PROM), flash memory, etc., in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in method 62 may be written in any combination of one or more programming languages, including an object oriented programming language such as C++ or the like and conventional procedural programming languages, such as the "C" programming language or similar programming languages. Finally, a shading language (which may even be pre-compiled or JITed/just-in-timed on the fly) can also be used.

Processing block 64 provides for converting a texture image into a compressed image possibly offline based on a compression algorithm. Virtual address space can be reserved at block 66 at runtime for a virtual image corresponding to the texture image. Block 68 provides for issuing a texture sampling request in real-time for a tile of the texture image, wherein the tile is a hardware page-sized region of the texture image; this is usually the result of the application running a fragment shader. Notification of a page miss may be received at block 70 in response to the texture sampling request, wherein the page miss can be mapped to the tile based on a faulting virtual address identified by the page miss. Block 72 provides for decoding the fetched tile based on a decompression algorithm that reverses the compression from block 64. If the decode process at block 72 is not fast enough, stalls in the rendering pipeline could occur. Accordingly, the application 34 may continue to render the current frame in parallel with the decode process and may, for example, obtain the results for the current texture by substituting data from a different level in the MIP-chain for the texture (e.g., just-too-late scheduling). Such an approach can improve efficiency.

The decoded tile can be stored as an entry in a cache at block 74. In one example, a cache may be used if there are multiple fixed-function hardware texture samplers on the chip. In such a case, the cache would enable the mapping process of block 76 to be performed in a fashion that appears to be atomic to all of the texture samplers—either all of them see the mapping or none of them sees it. If there is a single fixed-function hardware texture sampler, the cache might be omitted. Block 76 provides for mapping the cache entry to the virtual image. The texture sampling request may be re-issued at block 78. As already noted, the application 34 may resolve the texture sampling request that resulted in the miss in a manner that obviates the need to re-issue the texture sampling request. Accordingly, block 78 might be bypassed as appropriate.

Returning now to FIG. 1, several virtual images may share the cache 32. The illustrated cache 32 represents the physical memory footprint of these textures in rendering the current set of frames. If the cache 32 fills, some (or all) of the pages may be evicted to make space for the new pages. Moreover, if the cache fills, second chance techniques in which evicted (e.g., marked as stale) pages may be re-used (e.g., marked as valid again) if needed until they are written over, can be used to enhance performance. Such an approach might become active when the cache 32 reaches a certain capacity (e.g., 90% full), in order to further enhance performance.

In addition, if the faulting virtual address is not available from the texture sampler 30, a software simulation of a texture sampling mechanism can be used to set up another rendering path and determine which textures are being accessed. The approach can work by building a texture atlas of the various textures used to render a scene. The atlas layout can be generated by packing tiles taken from different regions within one or more textures, wherein these tiles include all the texture samples required to render the scene. An indirection map indexed by texture can be built simultaneously. The atlas values can then be extracted from the full textures, and the atlas passed to a final rendering along with the indirection map. Looking up the texture ID and requested texture coordinates in the indirection map can yield a u,v coordinate pair to look up in the texture atlas, which is in turn referred to yielding the final texture lookup value. This technique can be conducted entirely by the GPU, with no CPU involvement.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
reserving at runtime virtual address space for a virtual image corresponding to a texture image;
binding the virtual address space as data a texture sampler reads when rendering, wherein the virtual address space is not backed by physical memory;
issuing a texture sampling request for a texel of the virtual image to the texture sampler that makes a read from a portion of the virtual image using a first virtual address of the reserved virtual address space;
receiving notification of a page miss in response to the sampler making the read, wherein the first virtual address remains the same during the page miss and is identified as a faulting virtual address by the page miss;
mapping the faulting virtual address to a tile in the virtual image in response to the page miss;
fetching the tile from a compressed image corresponding to the texture image;
decoding the fetched tile based on a decompression algorithm;
storing the decoded tile as an entry in a physical memory page of a cache;
mapping the entry to the virtual address space for the virtual image to be used in a future texture sampling request, wherein both a second virtual address of the entry of the decoded tile and the first virtual address are usable to refer to the decoded tile; and
obtaining a texel by re-issuing the texture sampling request in response to mapping the entry to the virtual address space for the virtual image.

2. The method of claim 1, further including converting the texture image into the compressed image offline based on a compression algorithm corresponding to the decompression algorithm.

3. The method of claim 1, wherein the decompression algorithm is unsupported by a source of the page miss notification.

4. The method of claim 1, further including determining the faulting address based on a software simulation of a texture sampling mechanism.

5. The method of claim 1, further including synthesizing a tile of the texture image.

6. The method of claim 5, wherein synthesizing the tile includes generating the tile based on one or more pre-existing entries in the cache.

7. The method of claim 5, wherein synthesizing the tile includes generating an impostor tile.

8. The method of claim 1, wherein the tile is a hardware memory page-sized region of the texture image.

9. The method of claim 1, further including using an indirection map when the faulting virtual address is not available.

10. The method of claim 1, further including:
breaking the compressed image into a plurality of tiles; and
storing the plurality of tiles in memory.

11. The method of claim 1, further including a graphics application that reserves the virtual address space, binds the virtual address space, issues the texture sampling request, receives the notification of the page miss, maps the faulting virtual address, fetches the tile, decodes the fetched tile, stores the decoded tile, maps the entry, and re-issues the texture sampling request, and wherein one of the texture sampler, an operating system, or a driver reports the faulting virtual address to the graphics application.

12. A non-transitory tangible computer readable medium comprising a set of stored instructions which, if executed, cause an apparatus to:
reserve at runtime a virtual address space for a virtual image corresponding to a texture image;

bind the virtual address space as data a texture sampler is to read when rendering, wherein the virtual address space is not backed by physical memory;

issue a texture sampling request for a texel of the virtual image to the texture sampler that makes a read from a portion of the virtual image using a first virtual address of the reserved virtual address space;

detect a page miss in response to the texture sampler making the read, wherein the first virtual address is to remain the same during the page miss and is to be identified as a faulting virtual address by the page miss;

map the faulting virtual address to a tile in the virtual image in response to the page miss;

fetch the tile associated with the page miss from a compressed image corresponding to the texture image;

decode the fetched tile based on a decompression algorithm;

store the decoded tile as an entry in a physical memory page of a cache;

map the entry to the virtual address space for the virtual image to be used in a future texture sampling request, wherein both a second virtual address of the entry of the decoded tile and the first virtual address are usable to refer to the decoded tile; and obtain a texel by re-issuing the texture sampling request in response to mapping the entry to the virtual address space for the virtual image.

13. The non-transitory tangible computer readable medium of claim 12, wherein the decompression algorithm is to be unsupported by a source of the page miss.

14. The non-transitory tangible computer readable medium of claim 12, wherein the instructions, if executed, further cause an apparatus to convert the texture image into the compressed image offline based on a compression algorithm that corresponds to the decompression algorithm.

15. The non-transitory tangible computer readable medium of claim 12, wherein the instructions, if executed, further cause an apparatus to synthesize the tile.

16. The non-transitory tangible computer readable medium of claim 15, wherein the instructions, if executed, further cause an apparatus to one of generate the tile based on one or more pre-existing entries in the cache and generate an impostor tile.

17. The non-transitory tangible computer readable medium of claim 12, wherein the tile is to be a hardware page-sized region of the texture image.

18. A system comprising:

a chip having graphics rendering hardware, a cache and a processor to execute an application with texture allocation logic to:

reserve at runtime virtual address space for a virtual image corresponding to a texture image;

bind the virtual address space as data the graphics rendering hardware is to read when rendering, wherein the virtual address space is not backed by physical memory;

issue a texture sampling request to the graphics rendering hardware that is to make a read from a portion of the virtual image using a first virtual address of the reserved virtual address space;

receive notification of a page miss from the graphics rendering hardware in response to the graphics rendering hardware making the read, wherein the first virtual address is to remain the same during the page miss and is to be identified as a faulting virtual address by the page miss;

map the faulting virtual address to a tile in the virtual image in response to the page miss;

fetch the tile associated with the page miss from a compressed image corresponding to the texturing image;

decode the fetched tile based on a decompression algorithm;

store the tile as an entry in a physical memory page of the cache;

map the entry to the virtual address space of the virtual image and off-chip memory to store the texture image, wherein both a second virtual address of the entry of the decoded tile and the first virtual address are usable to refer to the decoded tile; and obtain a texel by reissuing the texture sampling request in response to mapping the entry to the virtual address space for the virtual image.

19. The system of claim 18, wherein the decompression algorithm is unsupported by the graphics rendering hardware.

20. The system of claim 18, wherein the texture allocation logic is to synthesize the tile.

* * * * *